Jan. 8, 1963 W. A. MARTIN 3,072,035
AUTOMATIC EXPOSURE CONTROL FOR PROTOGRAPHIC CAMERAS
Filed June 3, 1959 2 Sheets-Sheet 1
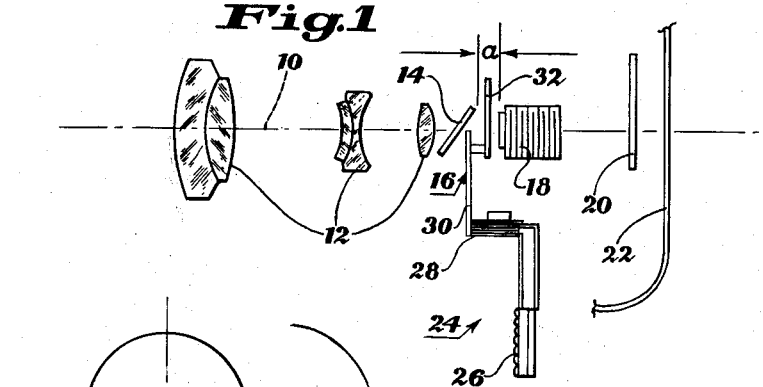
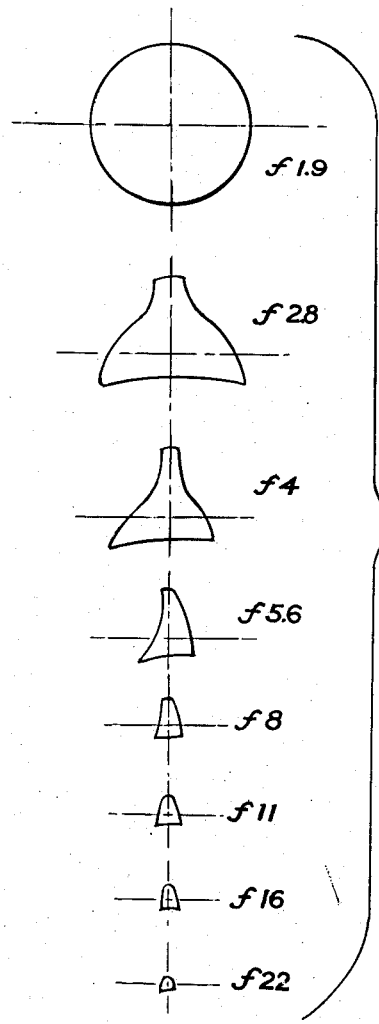
William A. Martin
INVENTOR.
BY R. Frank Smith
Robert W. Hampton
ATTORNEYS Jan. 8, 1963 W. A. MARTIN 3,072,035
AUTOMATIC EXPOSURE CONTROL FOR PHOTOGRAPHIC CAMERAS
Filed June 3, 1959 2 Sheets-Sheet 2
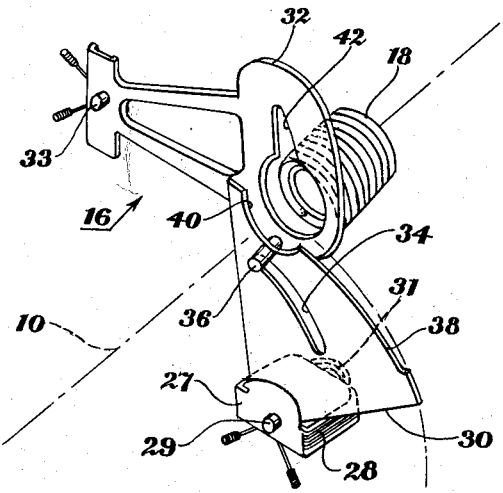
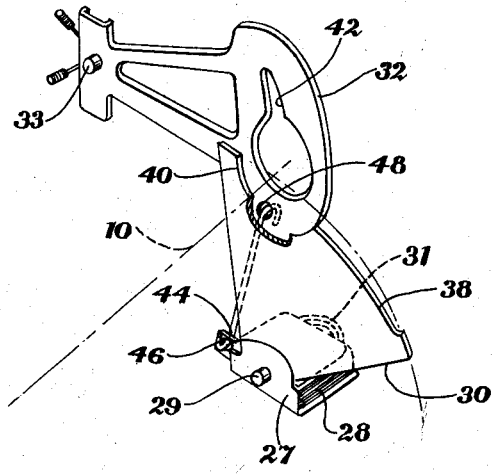
William A. Martin
INVENTOR.

United States Patent Office 3,072,035
Patented Jan. 8, 1963

3,072,035
AUTOMATIC EXPOSURE CONTROL FOR PHOTOGRAPHIC CAMERAS
William A. Martin, Rochester, N.Y., assignor to Eastman Kodak Company, Rochester, N.Y., a corporation of New Jersey
Filed June 3, 1959, Ser. No. 817,845
1 Claim. (Cl. 95—64)

The present invention relates to photographic cameras and more particularly concerns automatic exposure control apparatus for such cameras.

The exposure of film in a camera may be regulated automatically be adjusting the shutter speed or the exposure aperture or both as a function of scene brightness. In cameras wherein the exposure aperture is adjusted automatically it has been a common practice to employ an exposure meter for moving one or more diaphragm vanes differentially as a function of the degree of energization of a photoelectric cell in the meter by light from the viewed scene or object.

It is a primary object of the present invention to provide an improved mechanism for driving two or more diaphragm vanes under control of an exposure meter.

A further object of the invention is to provide a link coupling between an exposure meter and at least one diaphragm vane.

A further object is to provide a two-vane automatic diaphragm control system for a camera, wherein an outer surface on one vane cooperates with the periphery of an aperture in the other vane to form a composite exposure aperture.

Further objects of the invention will appear from the following description, reference being made to the accompanying drawings, wherein:

FIG. 1 is a side view of a first embodiment of the invention showing its employment in a camera having zoom-type taking lens;

FIG. 2 is a series of front views of the composite exposure apertures formed by a pair of diaphragm vanes constructed according to one form of the invention;

FIG. 3 is an isometric view of a first embodiment of the diaphragm vane and drive structure; and FIG. 4 is an isometric view of a modification of the diaphragm vane drive structure.

Referring to FIG. 1, a typical zoom-type camera employing automatic exposure control has a lens axis 10 on which are arranged a zoom-lens converter system 12, a beam splitter 14 mounted at an angle to the lens axis 10 for transmitting a portion of scene light to a reflex viewfinder (not shown), a diaphragm mechanism indicated generally at 16, a taking lens 18, a shutter 20 and a photosensitive surface as a film strip 22.

In order to automatically control the exposure in such cameras, as a function of scene brightness, it is convenient to adjust the exposure aperture formed by the diaphragm mechanism 16 under control of an exposure meter indicated generally at 24. The meter comprises a photocell 26 disposed for illumination and energization by light from the photographic subject. Cell 26 is connected to and energizes a mechanical output member of the meter, such as a pivoted coil 28 of an electric measuring instrument of a type well known in the art. Instead of the pivoted coil of a measuring instrument, the mechanical output member may comprise the armature of a solenoid or a member moved by a hot-wire actuator or some other device whose position is a function of its degree of electrical energization.

Coil 28 may be used to regulate the diaphragm aperture by means of an apertured vane 30 connected to the coil and pivoting with that coil to various positions relative to axis 10 in response to changes in scene brightness. The aperture in vane 30 may thereby be adjusted relative to the lens axis.

It is desirable to use two or more such vanes in order to optimize the shape of the exposure aperture and its centralization relative to the lens axis. For this purpose a second apertured vane 32 may be coupled to and driven by the first vane 30. However, as can be seen in FIG. 1, the zoom-converter optics 12 occupies a large longitudinal space on axis 10 and, especially where a beam splitter 14 also is provided on that axis (for a reflex view finder), there is a minimum of space available between the zoom optics and the taking lens 18 for the two diaphragm blades 30 and 32. This space is indicated in FIG. 1 by the dimension "*a*." The present invention includes as one of its features a vane configuration that renders it possible to employ a two-vane diaphragm in an extremely confined space on the lens axis.

Referring to FIG. 3, the first vane 30 is shown integrally attached to a frame 27 of coil 28 for pivoting movement about a horizontal coil axis 29 and has a slot 34 cooperating with a pin 36 on the second vane 32, which is pivoted about a second horizontal axis 33. (In the following description and the appended claim, wherever reference is made to coil 28 it will be understood to include frame 27 which moves with the coil and suports it.) When coil 28 receives less than a predetermined energization from the photocell, the coil and vane 30 are urged to initial angular positions, as shown in FIG. 3, by the usual return springs, such as 31, through which the coil is energized by the photocell. Slot 34 and pin 36 also normally maintain vane 32 in its initial angular position as shown in FIG. 3.

An exposure regulating surface on vane 30 comprises an upper cam-shaped surface 38 extending from right to left and terminating in a rounded recess 40, which is aligned with lens axis 10 when the vanes are in their initial positions as shown. Surface 38 does not extend above axis 10 and therefore permits vane 30 to be mounted along that axis directly beneath, i.e., in vertically overlapping relation to the topmost portion of beam splitter 14 (FIG. 1), thereby making maximum use of the restricted space "*a*" along that axis. Cooperating with surface 38 and recess 40 of vane 30 is an elongated, tapered aperture 42 of vane 32. In the initial positions of the vanes the maximum width of aperture 42 is aligned with the lens axis and depression 40 of vane 30, thereby forming the largest exposure aperture, corresponding to minimum scene brightness and indicated by way of example as *f*/1.9 in FIG. 2. When coil 28 receives successively greater amounts of energy from the photocell, the vanes 30 and 32 are pivoted into greater overlapping relation and form successively smaller exposure apertures on axis 10, as indicated at *f*/2.8 to *f*/22 in FIG. 2.

A modification of the structure for driving vane 32 is shown in FIG. 4, where the pin and slot coupling between vanes is replaced by a less expensive link 44, which extends between a hole 46 in coil frame 27 and a hole 48 in vane 32. Link 44 is free for pivotal movement in holes 46 and 48. Since coil 28 and vane 30 move integrally, the first end of link 44 may, of course, be attached to either the coil (or its frame 27) or vane 30.

The invention has been described in detail with particular reference to preferred embodiments thereof, but it will be understood that variations and modifications can be effected within the spirit and scope of the invention as described hereinabove and as defined in the appended claim.

I claim:

In a camera having means disposed on a horizontal axis for focusing an image of a viewed scene onto a photosensitive surface and having a beam splitter located on said axis and disposed in a nonvertical plane crossing said axis, the combination comprising: an exposure meter disposed for illumination by light from said scene and having a photocell and a movable mechanical output member coupled to said photocell and positioned under control thereof as a function of the intensity of said light; first and second movable diaphragm vanes having cooperating surfaces adapted for movement relative to said focusing means upon movement of said vanes for establishing an exposure aperture, the cooperating surface in said first vane comprising a portion of the outer periphery of said first vane, the cooperating surface of said second vane comprising an elongated, tapered aperture, said first vane being mounted for pivotal movement and having the cooperating surface thereof in vertically overlapping relation with a part of said beam splitter lying on the opposite side of said axis from the pivotal mounting of said first vane; and means coupling said output member to each of said vanes for moving the latter in response to movement of said output member, thereby to vary the size of said exposure aperture as a function of the intensity of said light.

References Cited in the file of this patent

UNITED STATES PATENTS

| | | |
|---|---|---|
| 1,813,635 | Myers et al. | July 7, 1931 |
| 2,209,639 | Tonnies | July 30, 1940 |
| 2,421,499 | Guedon | June 3, 1947 |
| 2,595,750 | Back | May 6, 1952 |
| 2,841,064 | Bagby et al. | July 1, 1958 |

FOREIGN PATENTS

| | | |
|---|---|---|
| 698,573 | Great Britain | Oct. 21, 1953 |